(12) United States Patent
Blasko

(10) Patent No.: US 11,290,023 B2
(45) Date of Patent: Mar. 29, 2022

(54) MODEL PREDICTIVE CONTROL FOR MATRIX CONVERTER OPERATING IN CURRENT CONTROL MODE WITH LOAD CURRENT ESTIMATION

(71) Applicant: Hamilton Sundstrand Corporation, Charlotte, NC (US)

(72) Inventor: Vladimir Blasko, Avon, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 176 days.

(21) Appl. No.: 16/381,947

(22) Filed: Apr. 11, 2019

(65) Prior Publication Data
US 2020/0328709 A1 Oct. 15, 2020

(51) Int. Cl.
H02M 5/257 (2006.01)
G05B 13/04 (2006.01)

(52) U.S. Cl.
CPC ........ *H02M 5/2576* (2013.01); *G05B 13/048* (2013.01)

(58) Field of Classification Search
CPC ...... H02M 5/257; H02M 5/2573; H02M 5/27; H02M 5/271; H02M 5/275; H02M 5/293;
(Continued)

(56) References Cited

U.S. PATENT DOCUMENTS 6,058,028 A * 5/2000 Czerwinski ........... H02M 5/297
318/811
9,705,420 B2 7/2017 Quevedo et al.
(Continued)

FOREIGN PATENT DOCUMENTS

CN 107634657 A 1/2018
EP 2978122 A1 1/2016
(Continued)

OTHER PUBLICATIONS

M. Rivera; P. Correa; J. Rodriguez; I. Lizama; J. Espinoza; C. Rojas; "Predictive control with active damping in a Direct Matrix Converter"; Nov. 6, 2009; IEEE; 2009 IEEE Energy Conversion Congress and Exposition; pp. 3057-3062 (Year: 2009).*
(Continued)

*Primary Examiner* — Thienvu V Tran
*Assistant Examiner* — Shahzeb K Ahmad
(74) *Attorney, Agent, or Firm* — Locke Lord LLP; Scott D. Wofsy; Judy R. Naamat

(57) ABSTRACT

A matrix converter system operating in current control mode is provided. The matrix converter includes a switching matrix coupled between a low voltage side and a high voltage side, wherein the matrix converter is coupled at its low voltage side to a generator for receiving an input power including an input current and transforming the input power into an output power at its high voltage side, wherein a load is coupled to the high voltage side. The control system includes a load observer and a model predictive controller (MPC). The load observer is configured to estimate a load current that flows to the load from the high voltage side of the matrix converter as a function of a switching state of the switching matrix, an output voltage output at the high voltage side of the matrix converter, and the input current. The MPC is configured to select the switching state of the switching matrix to meet one or more control objectives defined by minimization of a multi-objective function that tracks the output voltage and the input current using the estimated load current.

15 Claims, 5 Drawing Sheets

(58) Field of Classification Search
CPC ........ H02M 5/297; H02M 5/45; H02M 5/458;
H02M 5/2576; H02M 5/273; H02M 1/08;
H02M 2001/0003; H02M 2001/0054;
H02M 2001/0009; G05B 13/042; G05B
13/048; H02P 21/22; H02P 21/14; H02P
21/0003
See application file for complete search history.

(56) References Cited

U.S. PATENT DOCUMENTS

| | | | | |
|---|---|---|---|---|
| 10,074,978 | B2* | 9/2018 | Geyer | H02M 1/08 |
| 10,958,183 | B2* | 3/2021 | Vijayagopal | H02M 5/297 |
| 2010/0149848 | A1* | 6/2010 | Urushibata | H02M 5/293 |
| | | | | 363/148 |
| 2014/0254230 | A1* | 9/2014 | Inomata | H02M 5/297 |
| | | | | 363/163 |
| 2014/0265952 | A1* | 9/2014 | Katariya | H02P 21/0003 |
| | | | | 318/400.02 |
| 2017/0160760 | A1* | 6/2017 | Blasko | G05B 13/048 |
| 2018/0131266 | A1 | 5/2018 | Rohr et al. | |

FOREIGN PATENT DOCUMENTS

| | | |
|---|---|---|
| WO | WO-2014090886 A2 | 6/2014 |
| WO | WO-2016202623 | 12/2016 |

OTHER PUBLICATIONS

Vladimir Blasko; "Universal optimal model predictive control of multi-phase AC converters"; Sep. 1, 2016; IEEE; 2016 IEEE 17th Workshop on Control and Modeling for Power Electronics (COMPEL) (Year: 2016).*

M. Vijayagopal; L. Empringham; L. de Lillo; L. Tarisciotti; P. Zanchetta; P. Wheeler; "Current control and reactive power minimization of a direct matrix converter induction motor drive with Modulated Model Predictive Control"; Feb. 4, 2016; IEEE; 2015 IEEE Precede; pp. 103-108 (Year: 2016).*

Extended European Search Report for European Patent Application No. EP19210214.3, dated May 29, 2020.

* cited by examiner

MODEL PREDICTIVE CONTROL FOR MATRIX CONVERTER OPERATING IN CURRENT CONTROL MODE WITH LOAD CURRENT ESTIMATION

STATEMENT REGARDING FEDERALLY SPONSORED RESEARCH OR DEVELOPMENT

This invention was made with government support under contract number DE-AR00000891, under the ARPA-E FOA, titled Power Conversion Through Novel Current Source Matrix Converter, awarded by the U.S. Department of Energy, April 2018, under Award DE-FOA-1727-1510 under the CIRCUITS program. The government has certain rights in the invention.

BACKGROUND

1. Field of the Disclosure

The present disclosure relates to a matrix converter, and more particularly, to model predictive control of a matrix converter operating in current control mode.

2. Description of Related Art

Model Predictive Control (MPC) is a method of process control that enables optimal control of a converter to meet a selected set of criteria, for example tracking of waveforms, minimization of losses etc. Limitations can exist regarding the criteria that can be tracked and controlled. Particularly, obtaining information about load current to use for tracking output voltage or current from the matrix converter can require a costly or bulky current sensor.

While conventional methods and systems have generally been considered satisfactory for their intended purpose, there is still a need in the art for a matrix converter that can track output voltage or current with advantages related to minimization of the losses provided by MPC, while avoiding cost of a current sensor for measurement of output load current, as load is not generally known and therefore was not so far mathematically modeled or predicted as needed for MPC

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a matrix converter system having a current control mode operation. The matrix converter includes a switching matrix coupled between a low voltage side and a high voltage side, wherein the matrix converter is coupled at its low voltage side to a generator for receiving an input power including an input current and transforming the input power into an output power at its high voltage side, wherein a load is coupled to the high voltage side.

The control system includes a load observer and a model predictive controller (MPC). The load observer is configured to estimate a load current that flows to the load from the high voltage side of the matrix converter as a function of a switching state of the switching matrix, an output voltage output at the high voltage side of the matrix converter, and the input current. The MPC is configured to select the switching state of the switching matrix to meet one or more control objectives defined by minimization of a multi-objective function that tracks the output voltage and the input current using the estimated load current.

In embodiments, the load observer can be further configured to determine the output current as a function of a transpose of the switching function and the input current, and to determine an estimated output voltage as the integration of a difference between the output current and the estimated load current.

In embodiments, the estimated load current by the load observer can further include applying a correction factor to a difference between the estimated output voltage and the sampled/measured output voltage.

In embodiments, the matrix converter system can further include a reactive current generator that can be configured to generate a reactive current reference as a function of the estimated output voltage and back electromotive frequency (EMF) of the controllable generator, wherein the reactive current reference can be used to determine an input current reference that can be provided to the MPC and used to avoid saturation of the matrix converter.

In embodiments, the matrix converter system can be further configured to receive an output voltage reference, wherein the output voltage reference is obtained based on a system input, the matrix converter system can further include a proportional integral (PI) regulator that can be configured to apply proportional integral processing to the difference between magnitude of the voltage reference and magnitude of the output voltage to determine an active current reference, wherein the active current reference can be used to regulate the output voltage.

In embodiments, the MPC can be further configured to test different switching states of switches of the matrix converter to select an optimal switching state that incurs lowest cost of an error function, wherein the error function can determine a difference between a prediction of the input current reference and a prediction of an estimated input current and/or a difference between a prediction of the output voltage reference and a prediction of the estimated, output voltage.

In embodiments, determination of the predicted estimated input current can be a function of the present input current as sampled, the present input voltage as sampled, and characteristics of the generator.

In embodiments, the characteristics of the generator include back EMF and internal inductance of windings of the generator.

In accordance with still another aspect of the disclosure, a control system is provided for a matrix converter operating in current control mode. The control system includes a load observer and a model predictive controller (MPC). The load observer is configured to estimate a load current that flows to a load provided at a high voltage side of the matrix converter as a function of a switching state of a switching matrix, an output voltage at the high voltage side of the matrix converter, and an input current provided to a low voltage side of the matrix converter. The MPC is configured to select the switching state of the switching matrix to meet one or more control objectives defined by minimization of a multi-objective function that tracks the output voltage and the input current using the estimated load current.

In embodiments, the load observer can be further configured to determine the output current as a function of a transpose of the switching function and the input current, and to determine an estimated output voltage as the integration of a difference between the output current and the estimated load current.

In embodiments, determining the estimated load current by the load observer can further include applying a correction factor to a difference between the estimated output voltage and the output voltage.

In embodiments, determining an input reference current that can be a function of at least one of a reactive current reference and an active current reference. When the input current reference can be a function of the reactive current reference, the reactive current reference can be determined as a function of the estimated output voltage and back electromotive frequency (EMF) of the controllable generator. When the input current reference can be a function of the active current reference, the active current reference can be determined as a function of proportional integral processing applied to the difference between magnitude of a voltage reference received as a system input and magnitude of the output voltage. The MPC can be further configured to test different switching states of switches of the matrix converter to select an optimal switching state that incurs lowest cost of an error function, wherein the error function can determine a difference between a prediction of the input current reference and a prediction of an estimated input current and/or a difference between a prediction of the output voltage reference and a prediction of the estimated output voltage.

In embodiments, wherein determination of the predicted estimated input current can be a function of the present input current as sampled, the present input voltage as sampled, and characteristics of the generator.

In another aspect, a method of controlling operation of a matrix converter operating in a current control mode operation is provided. The method includes estimating a load current that flows to a load provided at a high voltage side of the matrix converter as a function of a switching state of a switching matrix of the matrix converter, an output voltage output at the high voltage side of the matrix converter, and an input current provided to the matrix converter at a low voltage side of the matrix converter, and selecting a switching state of the switching matrix to meet one or more control objectives defined by minimization of a multi-objective function that tracks the output voltage and the input current using the estimated load current.

In embodiments, the method can further include determining the output current as a function of a transpose of the switching function and the input current, and determining an estimated output voltage as the integration of a difference between the output current and the estimated load current.

In embodiments, estimating the load current can further include applying a correction factor to a difference between the estimated output voltage and the output voltage.

In embodiments, the method can further include testing different switching states of switches of the matrix converter, determining an error function as the difference between a prediction of an input current reference and a prediction of an estimated input current and/or a difference between a prediction of a output voltage reference and a prediction of the estimated output voltage, and selecting an optimal switching state of the matrix converter that incurs lowest cost of the error function based on the testing.

In embodiments, determination of the predicted estimated input current can be a function of the present input current as sampled, the present input voltage as sampled, and characteristics of the generator.

In embodiments, the method can further include generating a reactive current reference as a function of the estimated output voltage and back electromotive frequency (EMF) of the controllable generator, determining the input current reference as a function of the reactive current reference, and using the input current reference to avoid saturation of the matrix converter.

In embodiments, the method can further include receiving the output voltage reference as a system input, the matrix converter system applying proportional integral processing to the difference between magnitude of the output voltage reference and magnitude of the output voltage, determining an active current reference based on the proportional integral processing, determining the input current reference as a function of the active current reference, and using the input current reference to regulate the output voltage.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

A matrix converter (MxC) control system is disclosed that uses model predictive control (MPC) for controlling an MxC that is operated in a current control mode (CCM). The control system can obtain information about load current to use for tracking voltage or current output from the MxC by estimating load current, without the need to include a costly or bulky load current sensor at the load.

Selection of switches of a switching matrix in a power circuit, such as the MxC< to be turned on or off is done by minimization of a multi-objective function. In this particular case, a multi-objective function used has two terms, (a) a first error between output voltage reference and sampled or measured output voltage and (b) a second error between input current reference and sampled (wherein sampled signals can be measured at discrete intervals) input current. The output voltage and input current can be sampled and provided as feedback signals. Error terms can be formulated as the difference between squares or absolute values of mentioned voltages and currents. Thus, the disclosed multi-objective function selects switching states of the switching matrix by turning on and off appropriate switches in a power stage of the MxC to minimize a sum of the first and second errors multiplied with respective selected weights to track the output voltage and input current (using respective feedback signals) with their respective references.

Figure 1:
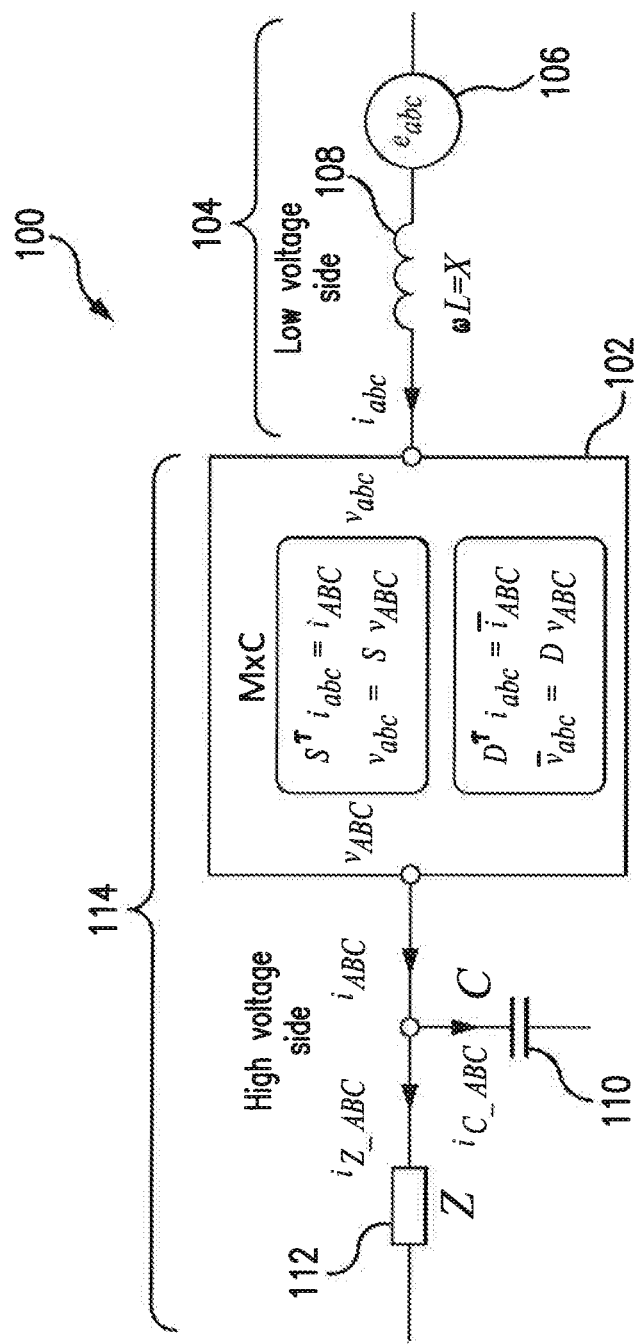
FIG. 1 is a block diagram of an equivalent circuit of an example matrix converter coupled between a generator and a load, in accordance with embodiments of the disclosure.

FIG. 1 shows an equivalent circuit of a converter system 100 having an MxC 102 operating in CCM. Power flows as three-phase input to the MxC 102 at a low voltage side denoted by lower case letters (a, b ,c) towards a three-phase high voltage denoted by upper case letters (A, B, C). At the low side, power is input to the MxC 102 by a generator 104, represented by back electromotive frequency (EMF) voltage ($e_{abc}$) 106 and inductance (wL=X) 108, with an input voltage $v_{abc}$ and input current $i_{abc}$ provided to the MxC 102. At the high side, power is output from the MxC 102 to a capacitor bank (C) 110 and load (Z) 112. Voltage across the capacitors of capacitor bank 110 is represented as output voltage $v_{ABC}$. A load current $i_{ABC}$ flows from the MxC 102 to load 112. The combination of the MxC 102, capacitor bank 110, and load 112 is referred to as plant 114. With MxC 102 operating in CCM, the input voltage $v_{abc}$ is controlled and supplied by the generator 104, with control of the output voltage $v_{ABC}$ provided through control of input current $i_{abc}$.

Matrix converters operating in current control mode are described in U.S. patent application Ser. No. 15/852,154 to Vladimir Blasko, entitled MATRIX CONVERTER TOPOLOGY AND OPERATION IN A CURRENT CONTROL MODE, filed Dec. 22, 2017.

Equation (1) and Equation (2) are applied via MxC 102 as follows:

$$S^T i_{abc} = i_{ABC} \quad \quad (A)$$
$$v_{abc} = S v_{ABC}$$

$$D^T i_{abc} = \bar{i}_{ABC} \quad \quad (B)$$
$$\bar{v}_{abc} = D v_{ABC}$$

wherein $S^T$ is a transposed switching matrix of MxC 102, S is a switching matrix of the MxC 102, D is a duty cycle matrix of the MxC 102, and superscript T indicates a transposed matrix.

Figure 2:
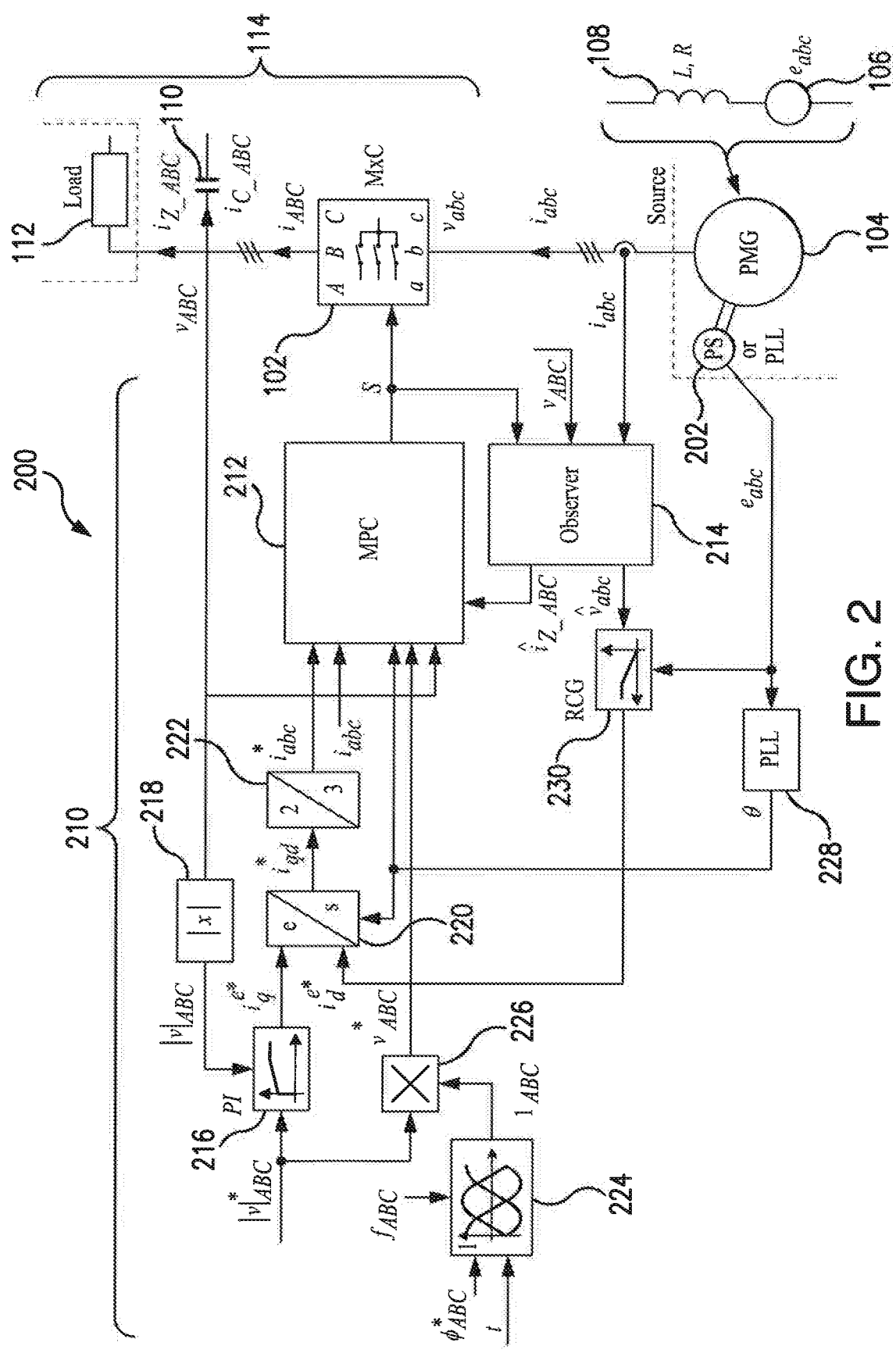
FIG. 2 is a block diagram of a matrix converter operating in current control mode (CCM) controlled using MPC and proportional integral (PI) control, in accordance with embodiments of the disclosure.

FIG. 2 is a block diagram of a converter system 200 having a controller 210 coupled to MxC 102, wherein MxC 102 is coupled between a generator 104 and capacitor 110 and load 112. The generator 104 can be, for example, a multiphase permanent magnet generator (PMG) having internal inductances 108 of windings of generator 104. Generator 104 generates back EMF voltage 106 ($e_{abc}$) in its windings. Load 112 can be a three phase balanced load. The output voltage $v_{ABC}$ provided to the load 112 can be measured for each phase across capacitors 110, wherein capacitors 413 filter output voltage $v_{ABC}$. As shown in FIG. 1, output voltage $v_{ABC}$ is the voltage across the capacitors of capacitor bank 110 and load current $i_{ABC}$ flows from MxC 102 to load 112 and capacitor 110. Input current $i_{abc}$ and input voltage $v_{abc}$ are provided from generator 104 to MxC 102.

A position sensor 202 (e.g., a resolver on a shaft of the generator 104) can be coupled to generator 104. The position sensor 202 can determine an angular position of a rotor of generator 104), and thus, based upon sampled input voltage ($v_{abc}$) and/or current ($i_{abc}$), an angular position θ of generated voltage, meaning back EMF $e_{abc}$ of the generator 104. Alternatively or additionally, the angular position θ can be determined using a phase lock loop (PLL), such as if a separate voltage source is used.

The controller 210 includes an MPC controller 212, an observer 214, an external proportional integral (PI) regulator 216, a magnitude calculator 218, a rotator 220, a 2:3 transformer 222, a unity voltage reference vector generator 224, a multiplier 226, a phase lock loop (PLL) 228, and a reactive current generator (RCG) block 230.

The controller 210 uses a combination of MPC and cascaded PI control. With reference to the PI control, external PI regulator 216 regulates output current amplitude for creation of active current reference $i^{e*}{}_q$ in a synchronous reference frame. PI regulator 216 receives the output voltage reference vector $v^*{}_{abc}$ and obtains its amplitude $|v|^*{}_{ABC}$ and an amplitude of output voltage vector $|v|{}_{ABC}$ as determined by magnitude calculator 218. PI regulator 216 applies proportional integral processing to these inputs and outputs active current reference $i^{e*}{}_q$. Active current reference $i^{e*}$ is used to generate $i^*{}_{abc}$, which is input to the MPC 212, wherein the active component of $i^*{}_{abc}$ functions to control the output voltage $v_{ABC}$.

Both active current reference $i^{e*}{}_q$ and a reactive current reference $i^{e*}{}_d$ are provided to rotator 220. The combination of $i^{e*}{}_q$ and $i^{e*}{}_d$ creates current vector $i^{e*}{}_{qd} = i^{e*}{}_q - j\, i^{e*}{}_d$ with DC like components (under steady state conditions). RCG block 230 generates reactive current $i^{e*}{}_d$ as a function of back EMF vector $e_{abc}$ and estimated available output current $\hat{v}_{ABC}$ as output by observer 214, and reactance of generator 104, wherein reactive current $i^{e*}{}_d$ is used to determine an input current reference $i^*{}_{abc}$, so that the reactive component of input current reference $i^*{}_{abc}$ functions to keep the MPC controller 212 out of saturation.

Rotator 220 transforms $i^{e*}{}_{qd}$ from the synchronous/rotating reference frame to $i^*{}_{qd}$ in a stationary/fixed reference frame. In steady state condition, $i^*{}_{qd}$, is a stationary reference frame current vector with two alternating current (AC) components with phase displacement of 90° and equal amplitudes. Rotator 220 performs transformations from synchronous to stationary reference frame using angular position θ.

2:3 transformation block performs a 2:3 transformation to transform stationary reference frame current vector $i^*{}_{qd}$ into current reference $i^*{}_{abc}$, having three components. Input current reference $i^*{}_{abc}$ is provided to the MPC controller 212 for controlling input current $i_{abc}$. An active component of the input current reference $i^*{}_{abc}$ is used to control output voltage $v_{ABC}$, and the reactive component of the input current reference $i^*{}_{abc}$ is used to avoid saturation of the matrix converter 102. Input current $i_{abc}$ is provided by generator 104 to the low-voltage side of matrix converter 102, and is routed to the observer block 214 for making an estimation of load current. Input current $i_{abc}$ is further provided to model predictive block 212 for ensuring tracking or following of input current reference signals $i^*{}_{abc}$. MPC controller 212 further receives output voltage $v_{ABC}$ provided as a feedback signal, angular position θ, and a voltage reference signal $v^*{}_{ABC}$, wherein voltage reference signal $v^*{}_{ABC}$ is an output from the multiplier 226.

Formation of voltage reference signal $v^*{}_{ABC}$ is now described. Unity angle reference vector generator 224 receives an input angular reference position φ*, time t, and frequency of the MxC outputs $f_{ABC}$, and outputs a unity vector $1_{ABC}$, which has three sinusoidal waveforms with unity amplitude and phase displacement of 120°. Multiplier 226 receives the input voltage reference vector amplitude $|v|^*{}_{ABC}$, which it multiplies with the unity vector $1_{ABC}$ for determining voltage reference signal v*_{ABC}. The input voltage reference vector amplitude |v|*_{ABC} and angular reference position φ* are system inputs that can be internally generated, e.g., in an internal microprocessor within controller 210 where functions for controlling power of MxC 102 are implemented. Alternatively, system inputs input voltage reference vector amplitude |v|*_{ABC} and angular reference position φ* can be provided by an external system that controls MxC 102 as a subsystem.

Figure 3:
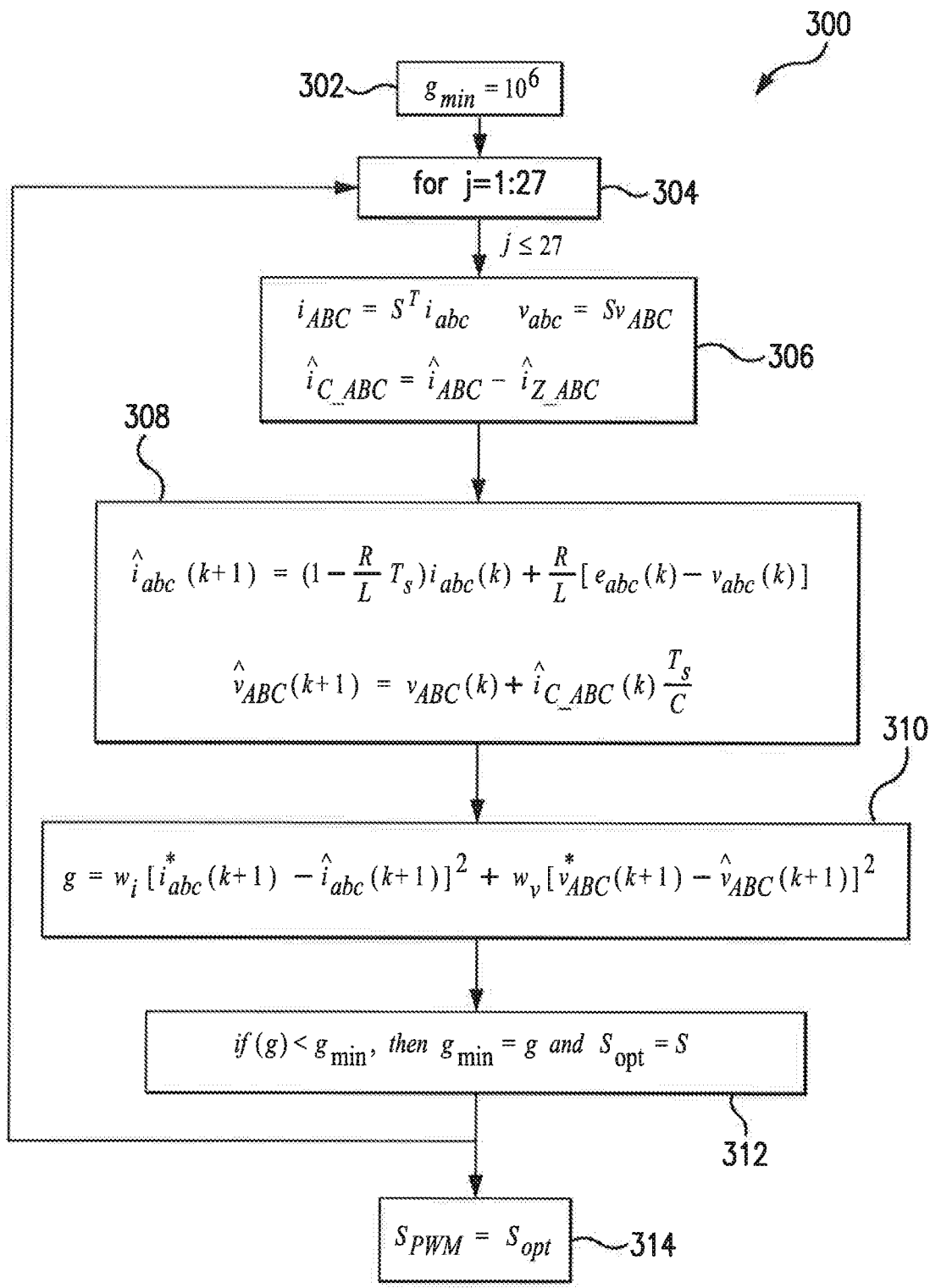
FIG. 3 is a flow diagram of an example method performed by an MPC of FIG. 2.

FIG. 3 shows an exemplary and non-limiting flowchart 300 illustrating a method for performing MPC in accordance with certain illustrated embodiments. The method can be performed by an MPC controller, such as MPC controller 212 shown in FIG. 2. Before turning to description of FIG. 3, it is noted that the flowchart in FIG. 3 shows an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, one or more of the steps can be omitted.

The MPC controller 212 in the example shown has only two objectives, to provide optimal tracking of input current $i_{abc}$ and voltage reference signal v*_{ABC}, by selecting appropriate states in switching matrix S that controls switching devices (e.g., transistors, such as MOSFETs) in MxC 102.

At operation 302, high initial value cost function is set, for example and without limitation as g=10^6, wherein g represents cost. At operation 304, a loop is initiated to search through all available switching states, which in the example shown, and without limitation, is twenty seven states. Each available switching state represents a different configuration of switching matrix S. A counter j is initialized, and a determination is made whether j has reached a max value, which is twenty seven in the example shown, without limitation. If the max value has not been reached, then the switching matrix is updated to a next state of the switching matrix.

At operation 306, the output current vector $i_{ABC}$, input voltage vector $v_{abc}$, and estimated capacitor current vector $\hat{i}_{C\_ABC}$ (meaning the current flowing through capacitors 110) are calculated for a given switching matrix S(j), meaning the switching matrix having the configuration used for iteration j according to Equations (3A) and (3B) below. According to example Equations (3A) and (3B), calculation of $\hat{i}_{C\_ABC}$ is determined using estimated load current $\hat{i}_{Z\_ABC}$ (meaning current through load 112) or sampled load current $i_{Z\_ABC}$ through load 112.

$$i_{abc}(k+1) = S^T i_{abc} \quad (3A)$$
$$v_{abc} = S v_{ABC}$$

$$\hat{i}_{C\_ABC} = \hat{i}_{ABC} - \hat{i}_{Z\_ABC} \quad (3B)$$

At operation 308, one step ahead predicted input current vector $\hat{i}_{abc}(k+1)$ and one step ahead predicted output voltage vector $\hat{v}_{ABC}(k+1)$ are calculated in accordance with example Equations (4A) and (4B).

$$\hat{i}_{abc}(k+1) = \left(1 - \frac{R}{L}T_s\right)i_{abc}(k) + \frac{R}{L}[e_{abc}(k) - v_{abc}(k)] \quad (4A)$$

$$\hat{v}_{ABC}(k+1) = v_{ABC}(k) + \hat{i}_{C\_ABC}(k)\frac{T_s}{C} \quad (4B)$$

"One step ahead" refers to the next-sampling interval (k+1) predicted by Equation (4A) at a present-sampled time interval (k), assuming a selected switching state S that corresponds to a particular value of counter j, where j=1 . . . 27 as determined at operation 304. R, L refer to internal resistance and inductance 108 of the generator winding. Sampling time $T_s$ is the duration of time intervals k and k+1.

As shown in Equation (4A), the predicted estimated input current $\hat{i}_{abc}(k+1)$ is a function of the present input current $i_{abc}$, the present input voltage $v_{abc}$, and characteristics of the generator 104, namely EMF, resistance, and inductance of the windings of generator 104. As shown in Equation (4B), the predicted output voltage is estimated as $\hat{v}_{ABC}(k+1)$ based on the present output voltage (e.g., as sampled) and an estimation of at least a portion of the output current, such as $\hat{i}_{C\_ABC}$ (e.g., as sampled). $\hat{i}_{C\_ABC}$ is a function of the estimated load current $\hat{i}_{Z\_ABC}$, as determined at step 306 using Equation (3B). As shown, when determining $\hat{v}_{ABC}(k+1)$, the portion of the output current $\hat{i}_{C\_ABC}$ is multiplied by $T_s/C$, where $T_s$ is the transpose switching matrix and C is the capacitance of capacitor bank 110 (shown in FIG. 1).

At operation 310, a weighted square of errors (or magnitude of errors) (a) the difference between a predicted one step ahead input current reference vector i*_{abc}(k+1) and predicted one step ahead input current $\hat{i}_{abc}(k+1)$ and (b) the difference between a predicted one step ahead voltage reference signal v*_{ABC}(k+1) and one step ahead predicted output voltage $\hat{v}_{ABC}(k+1)$ are minimized. Predicted, one step ahead, reference current i*_{abc}(k+1) and voltage $\hat{v}_{ABC}(k+1)$ reference values are created by assigning present values at the time instant k to the one instant ahead k+1, meaning: i*(k+1)=i*(k) and v*_{ABC}(k+1)=v*_{ABC}(k), thus predicted, one step ahead values of current and voltage references follow actually present current and voltage references, with only minimal one step delay. The minimization of errors (a) and (b) includes calculating the sum of errors (a) and (b) and using the sum to determine a present value of cost function g(j) for the present iteration in accordance with Equation (5).

$$g = w_i[i^*_{abc}(k+1) - \hat{i}_{abc}(k+1)]^2 + w_v[v^*_{ABC}(k+1) - \hat{v}_{ABC}(k+1)]^2 \quad (5)$$

Equation (5) is a multi-objective function that controls switching state S, which effects the values of $\hat{i}_{abc}$ and $\hat{v}_{ABC}$, so that in effect, the selection of the switching state S controls $\hat{i}_{abc}$ and $\hat{v}_{ABC}$, which is shown in operations 306, 308, and 310.

At operation 312, as shown in Equations (6), the value of g calculated at operation 310 is compared with the $g_{min}$, which is the smallest g determined from previous iterations. If the value calculated at operation 310 is the smaller value, then $g_{min}$ is updated to equal g and an optimal switching state $S_{opt}$ is updated to equal the current switching state S.

if $(g) < g_{min}$, then $g_{min} = g$ and $S_{opt} = S$; (6)

At operation 314, when the loop has exited once j equals the maximum value (wherein the maximum value is 27 in the example shown) and all of the matrix configurations have been processed, the switching state SPWM to be used by the switches of MxC 102 is set to be the optimal switching matrix $S_{OPT}$, which is the optimal switching state selected by the method shown in flowchart 300.

Observer 104 is a load observer which obtains information about the load current $i_{Z\_ABC}$ on the high voltage side of MxC 102, without the need to include a current sensor or to obtain an actual measurement of $i_{Z\_ABC}$. A model of the plant 114 showing three phases ABC, assuming a slow changing or constant load 112 is shown in accordance with Equations (7A) and (7B).

$$\frac{d}{dt}v_{ABC} = \frac{1}{C}i_{C\_ABC}; \; i_{C\_ABC} = i_{ABC} - i_{Z\_ABC} \tag{7A}$$

$$\frac{d}{dt}i_{Z\_ABC} = 0 \tag{7B}$$

The observer 104 is implemented based on Equations (8A) and (8B) below, with a slow changing or constant load current $i_{Z\_ABC}$.

$$\frac{d}{dt}\hat{v}_{ABC} = \frac{1}{C}(i_{ABC} - \hat{i}_{Z\_ABC}); \tag{8A}$$

$$\frac{d}{dt}\hat{i}_{Z\_ABC} = 0 - L_g(\hat{v}_{ABC} - v_{ABC}) \tag{8B}$$

In the example shown in Equations (8A) and (8B), without limitation to a particular gain module, a Luenberger type gain $L_g$ is used in the correction term.

Figure 4:
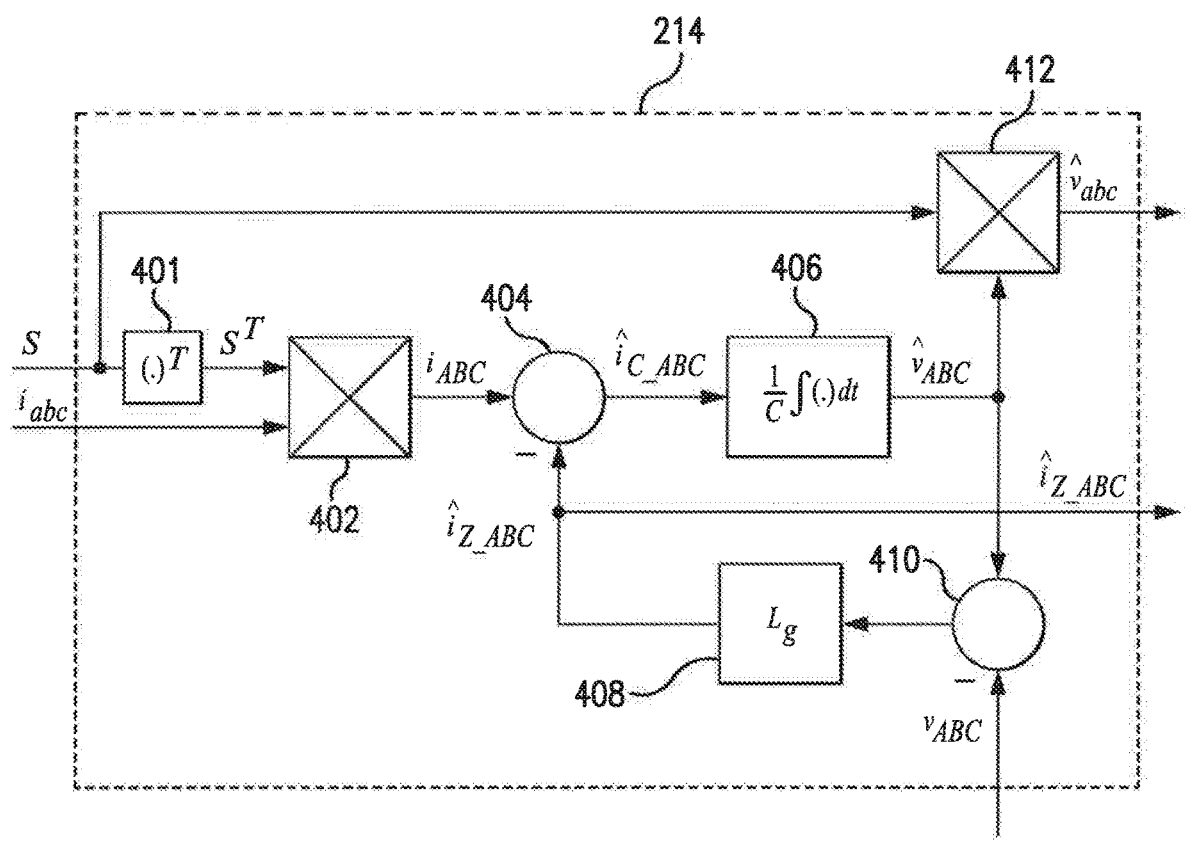
FIG. 4 is a block diagram of an observer included with a controller of the matrix converter in FIG. 2, in accordance with embodiments of the disclosure.

FIG. 4 shows a block diagram of observer 214. The observer 214 includes a transpose block 401, first multiplier 402, a first adder 404, an integrator 406, a gain module 408, a second adder 410, and a second multiplier 412. A transpose function is applies to switching matrix S at transpose block 401. The output $S^T$ from transpose block 401 is a transpose of switching matrix applied at multiplier 402 to input current $i_{abc}$ for transforming current $i_{abc}$ to $i_{ABC}$ from the low to high voltage side of the MxC 102. Consistent with Equation (7A), the output from gain module 408 $\hat{i}_{Z\_ABC}$ is subtracted by first adder 404 from output $i_{ABC}$ of transpose block 401 to determine estimated current capacitor current $\hat{i}_{C\_ABC}$ through capacitor 110 (shown in FIG. 1). Additionally, observer 214 outputs $\hat{i}_{Z\_ABC}$ for use by the MPC 212 (shown in FIG. 2).

Gain module 408 receives a difference between $\hat{v}_{ABC}$ and output voltage $v_{ABC}$, wherein $\hat{v}_{ABC}$ is output by integrator 406 and $v_{ABC}$ is a sampled output voltage provided as a feedback voltage, performs a gain function on $v_{ABC}$, and outputs $\hat{i}_{Z\_ABC}$. This difference is proportional to estimated load current estimate $\hat{i}_{Z\_ABC}$. Gain module 408 multiplies this difference with a correction term and outputs the product as $\hat{i}_{Z\_ABC}$, which is provided to first adder 404. Additionally, $\hat{i}_{Z\_ABC}$ is output by the observer 214 for use by the MPC 212, e.g., in Equation (3B).

Consistent with Equation (8A), integrator 406 integrates the estimated capacitor current $\hat{i}_{C\_ABC}$, and the output of the integrator 406 is the estimated capacitor voltage, which is equal to the estimated output voltage $\hat{v}_{ABC}$ that is output from the high-voltage side of the MxC 102. Observer 214 can output $\hat{v}_{abc}$ for use by the RCG 230 (shown in FIG. 2). Additionally, observer 214 can output $\hat{i}_{C\_ABC}$ for use by the MPC 212, e.g., in Equation (4B). At second adder 412, switching matrix S is multiplied by $\hat{v}_{ABC}$, and the product is $\hat{v}_{abc}$, consistent with Equation (3A). Observer 214 can output $\hat{v}_{abc}$ for use by the RCG block 230.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

Figure 5:
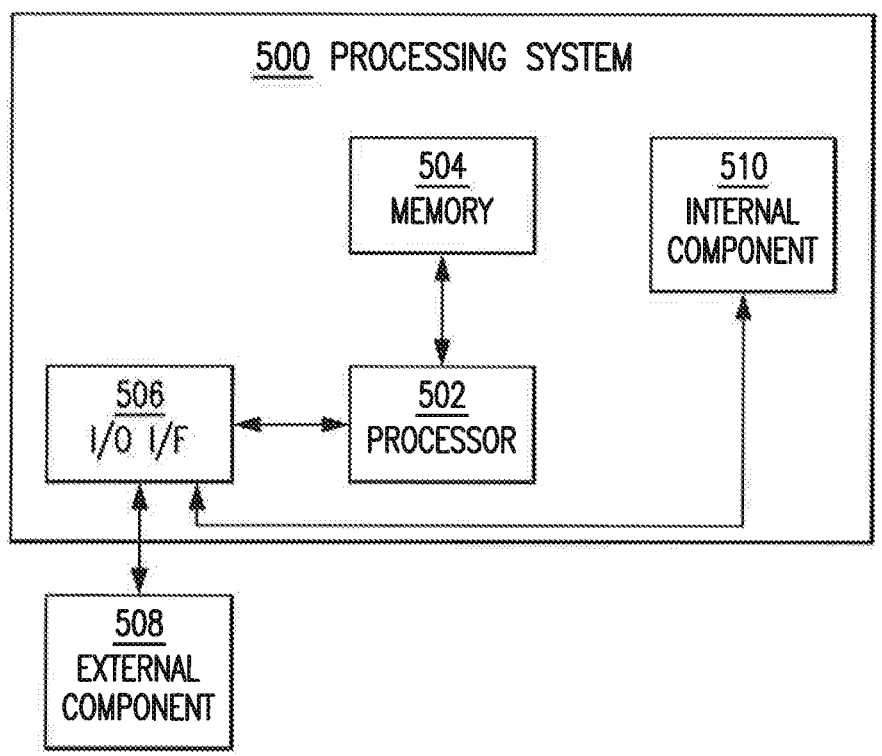
FIG. 5 is a block diagram of an exemplary computer system configured to implement components of a controller of the matrix converter system of FIG. 2.

With reference to FIG. 5, a block diagram of an example computing system 500 is shown, which provides an example configuration of the controller 210 or one or more portions of the controller 210. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a processing device 502, memory 504, an input/output (I/O) interface (I/F) 506 that can communicate with an internal component 510, and optionally an external component 508.

The processing device 502 can include, for example, a programmable logic device (PLOD), microprocessor, digital signal processor (DSP), a microcontroller, a field programmable gate array (FPGA), an application specific integrated circuit (ASCI), and/or other discrete or integrated logic circuitry having similar processing capabilities.

The processing device 502 and the memory 504 can be included in components provided in the FPGA, ASCI, microcontroller, or microprocessor, for example. Memory 504 can include, for example, volatile and non-volatile memory for storing data temporarily or long term, and for storing programmable instructions executable by the processing device 502. I/O I/F 506 can include an interface and/or conductors to couple to the one or more internal components 508 and/or external components 510.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the controller 210 may be implemented or executed by one or more computer systems, such as a microprocessor. Each computer system 500 can implement controller 26, or multiple instances thereof. In various embodiments, computer system 500 may include one or more of a microprocessor, an FPGA, application specific integrated circuit (ASCI), microcontroller. The computer system 500 can be provided as an embedded device. All or portions of the computer system 500 can be provided externally, such by way of a mobile computing device, a smart phone, a desktop computer, a laptop, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A matrix converter system having a current control mode operation comprising:
    a matrix converter having a switching matrix coupled between a low voltage side and a high voltage side, wherein the matrix converter is coupled at its low voltage side to a generator for receiving an input power including an input current and transforming the input power into an output power at its high voltage side, wherein a load is coupled to the high voltage side;
    a load observer configured to:
        estimate a load current that flows to the load from the high voltage side of the matrix converter as a function of a switching state of the switching matrix, an output voltage output at the high voltage side of the matrix converter, and the input current, and further applying a correction factor to a difference between the estimated output voltage and the output voltage,
        determine the output current as a function of a transpose of the switching function and the input current, and
        determine an estimated output voltage as the integration of a difference between the output current and the estimated load current;
    a model predictive controller (MPC) configured to select the switching state of the switching matrix to meet one or more control objectives defined by minimization of a multi-objective function that tracks the output voltage and the input current using the estimated load current; and
    a reactive current generator that is configured to generate a reactive current reference as a function of the estimated output voltage and back electromotive frequency (EMF) of the controllable generator, wherein the reactive current reference is used to determine an input current reference that is provided to the MPC and used to avoid saturation of the matrix converter.

2. A matrix converter system having a current control mode operation, wherein the matrix converter system is configured to receive an output voltage reference, wherein the output voltage reference is obtained based on a system input, the matrix converter system comprising:
    a matrix converter having a switching matrix coupled between a low voltage side and a high voltage side, wherein the matrix converter is coupled at its low voltage side to a generator for receiving an input power including an input current and transforming the input power into an output power at its high voltage side, wherein a load is coupled to the high voltage side;
    a load observer configured to estimate a load current that flows to the load from the high voltage side of the matrix converter as a function of a switching state of the switching matrix, an output voltage output at the high voltage side of the matrix converter, and the input current;
    a model predictive controller (MPC) configured to select the switching state of the switching matrix to meet one or more control objectives defined by minimization of a multi-objective function that tracks the output voltage and the input current using the estimated load current; and
    a proportional integral (PI) regulator that is configured to apply proportional integral processing to a difference between magnitude of the voltage reference and magnitude of the output voltage to determine an active current reference, wherein the active current reference is used to regulate the output voltage.

3. The matrix converter system of claim 2, wherein the load observer is further configured to determine the output current as a function of a transpose of the switching function and the input current, and to determine an estimated output voltage as the integration of a difference between the output current and the estimated load current.

4. The matrix converter system of claim 3, wherein determining the estimated load current by the load observer further includes applying a correction factor to a difference between the estimated output voltage and the output voltage.

5. The matrix converter system of claim 2, wherein the MPC is further configured to test different switching states of switches of the matrix converter to select an optimal switching state that incurs lowest cost of an error function, wherein the error function determines a difference between a prediction of the input current reference and a prediction of an estimated input current and/or a difference between a prediction of the output voltage reference and a prediction of the estimated, output voltage, wherein the output voltage reference is determined based on a system input.

6. The matrix converter system of claim 5, wherein determination of the predicted estimated input current is a function of the present input current as sampled, a present input voltage as sampled, and characteristics of the generator.

7. The matrix converter system of claim 6, wherein the characteristics of the generator include back EMF and internal inductance of windings of the generator.

8. A method of controlling a matrix converter system operating in current control, the method comprising:
    estimating a load current that flows to a load provided at a high voltage side of a matrix converter as a function of a switching state of a switching matrix of the matrix converter, an output voltage output at the high voltage side of the matrix converter, and an input current provided by a generator to the matrix converter at a low voltage side of the matrix converter; and
    selecting a switching state of the switching matrix to meet one or more control objectives defined by minimization of a multi-objective function that tracks the output voltage and the input current using the estimated load current;
    determining the output current as a function of a transpose of the switching function and the input current; and
    determining an estimated output voltage as the integration of a difference between the output current and the estimated load current;
    testing different switching states of switches of the matrix converter;
    determining an error function as a difference between a prediction of an input current reference and a prediction of an estimated input current, wherein determination of the predicted estimated input current is a function of the present input current as sampled, a present input voltage as sampled, and characteristics of the generator; and
    selecting an optimal switching state of the matrix converter that incurs lowest cost of the error function based on the testing.

9. The method of claim 8, wherein estimating the load current further includes applying a correction factor to a difference between the estimated output voltage and the output voltage.

10. A method of controlling a matrix converter system operating in current control, the method comprising:
    estimating a load current that flows to a load provided at a high voltage side of a matrix converter as a function of a switching state of a switching matrix of the matrix converter, an output voltage output at the high voltage side of the matrix converter, and an input current provided by a generator to the matrix converter at a low voltage side of the matrix converter; and
    selecting a switching state of the switching matrix to meet one or more control objectives defined by minimization of a multi-objective function that tracks the output voltage and the input current using the estimated load current;
    determining the output current as a function of a transpose of the switching function and the input current; and
    determining an estimated output voltage as the integration of a difference between the output current and the estimated load current;
    testing different switching states of switches of the matrix converter;
    determining an error function as a difference between a prediction of an input current reference and a prediction of an estimated input current:
    generating a reactive current reference as a function of the estimated output voltage and back electromotive frequency (EMF) of the controllable generator;
    determining the input current reference as a function of the reactive current reference; and
    using the input current reference to avoid saturation of the matrix converter.

11. A method of controlling a matrix converter system operating in current control, the method comprising:
    estimating a load current that flows to a load provided at a high voltage side of a matrix converter as a function of a switching state of a switching matrix of the matrix converter, an output voltage output at the high voltage side of the matrix converter, and an input current provided by a generator to the matrix converter at a low voltage side of the matrix converter; and
    selecting a switching state of the switching matrix to meet one or more control objectives defined by minimization of a multi-objective function that tracks the output voltage and the input current using the estimated load current;
    determining the output current as a function of a transpose of the switching function and the input current; and
    determining an estimated output voltage as the integration of a difference between the output current and the estimated load current;
    testing different switching states of switches of the matrix converter;
    determining an error function as a difference between a prediction of an input current reference and a prediction of an estimated input current and a difference between a prediction of an output voltage reference and a prediction of the estimated output voltage:
    obtaining the output voltage reference, wherein the output voltage reference is obtained based on a system input;
    applying proportional integral processing to a difference between magnitude of the output voltage reference and magnitude of the output voltage;
    determining an active current reference based on the proportional integral processing;
    determining the input current reference as a function of the active current reference; and
    using the input current reference to regulate the output voltage.

12. A control system for a matrix converter operating in current control mode, the control system comprising:
    a load observer configured to estimate a load current that flows to a load provided at a high voltage side of the matrix converter as a function of a switching state of a switching matrix, an output voltage at the high voltage side of the matrix converter, and an input current provided to a low voltage side of the matrix converter; and
    a model predictive controller (MPC) configured to select the switching state of the switching matrix to meet one or more control objectives defined by minimization of a multi-objective function that tracks the output voltage and the input current using the estimated load current, wherein the MPC further determines an input current reference that is a function of at least one of a reactive current reference and an active current reference, wherein:

when the input current reference is a function of the reactive current reference, the reactive current reference is determined as a function of the estimated output voltage and back electromotive frequency (EMF) of the controllable generator, when the input current reference is a function of the active current reference, the active current reference is determined as a function of proportional integral processing applied to the difference between magnitude of a voltage reference received as a system input and magnitude of the output voltage, and the MPC is further configured to test different switching states of switches of the matrix converter to select an optimal switching state that incurs lowest cost of an error function, wherein the error function determines a difference between a prediction of the input current reference and a prediction of an estimated input current and/or a difference between a prediction of an output voltage reference and a prediction of the estimated output voltage, wherein the output voltage reference is determined based on a system input.

13. The control system of claim 12, wherein the load observer is further configured to determine the output current as a function of a transpose of the switching function and the input current, and to determine an estimated output voltage as the integration of a difference between the output current and the estimated load current.

14. The control system of claim 13, wherein determining the estimated load current by the load observer further includes applying a correction factor to a difference between the estimated output voltage and the output voltage.

15. The control system of claim 12, wherein determination of the predicted estimated input current is a function of the present input current as sampled, the present input voltage as sampled, and characteristics of the generator.

* * * * *